Nov. 10, 1931.  W. B. CHELINI  1,831,286
DECOY DUCK
Filed July 18, 1929    2 Sheets-Sheet 1
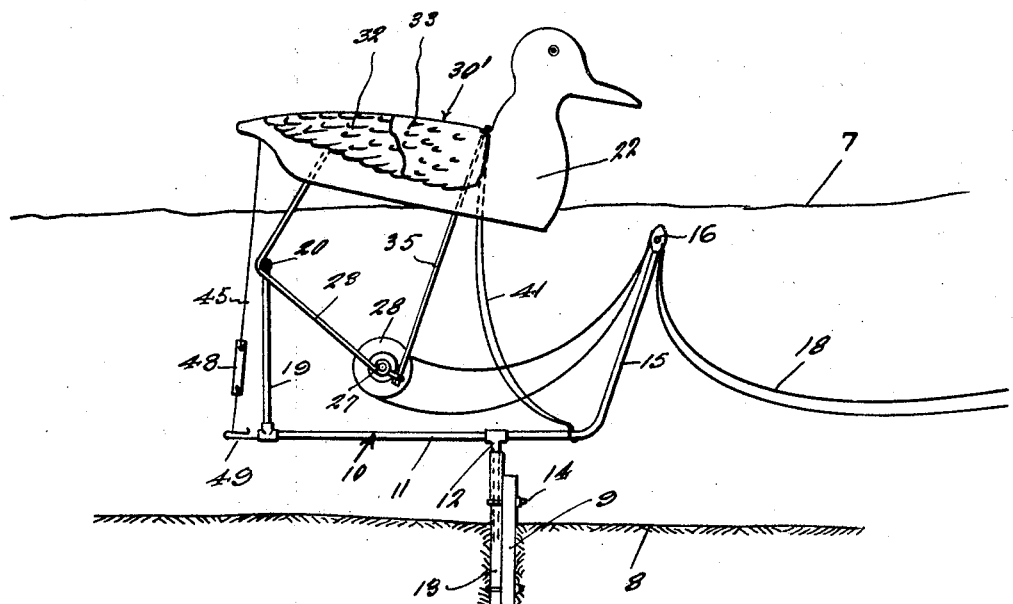
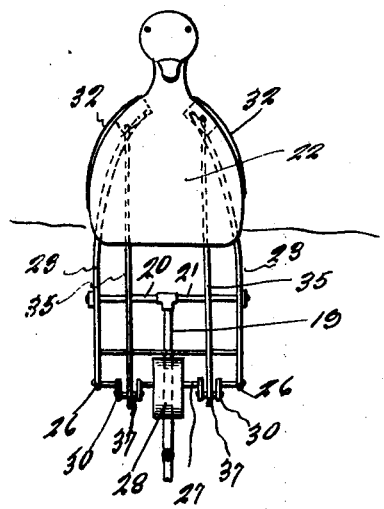
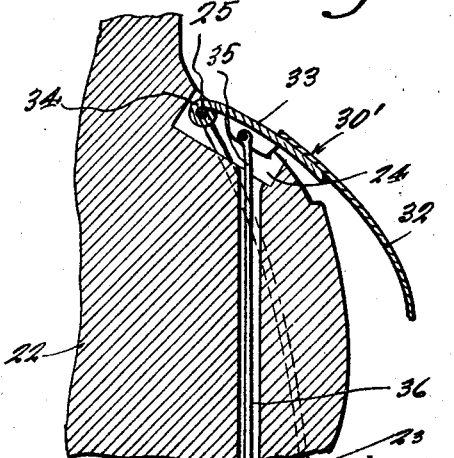
Inventor
William B. Chelini
By Clarence A. O'Brien
Attorney Nov. 10, 1931.  W. B. CHELINI  1,831,286
DECOY DUCK
Filed July 18, 1929  2 Sheets-Sheet 2
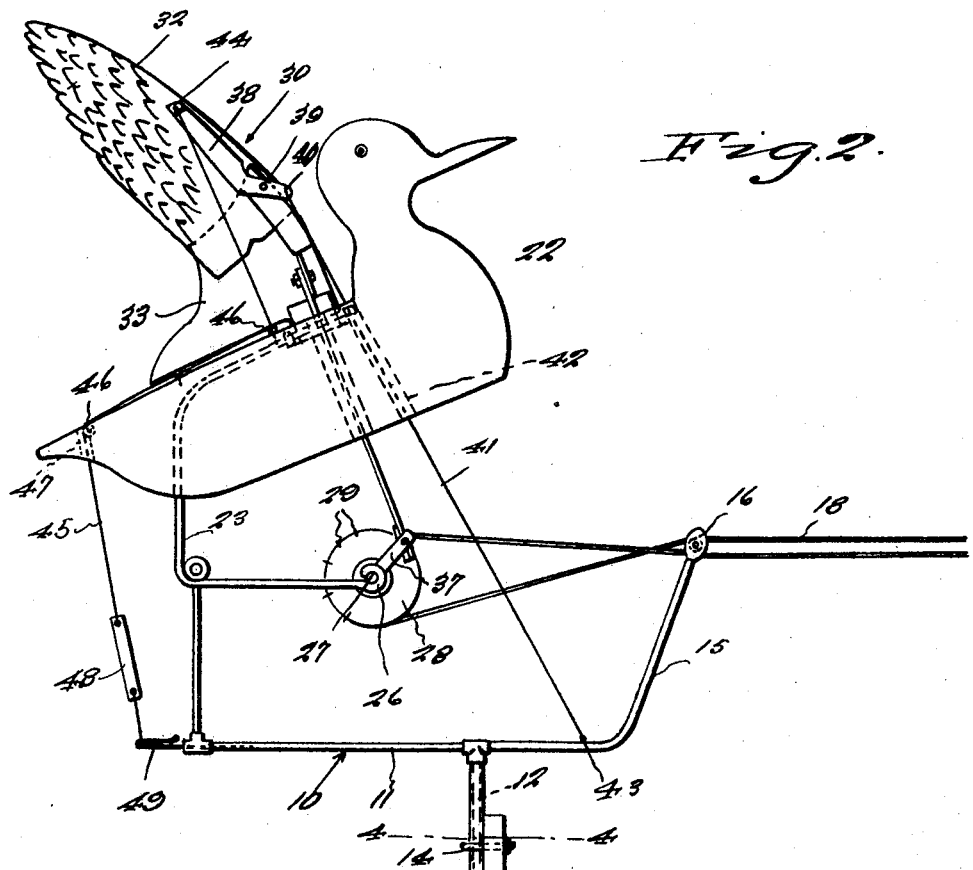
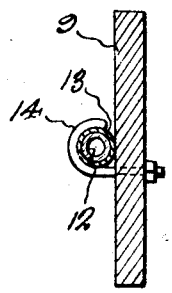
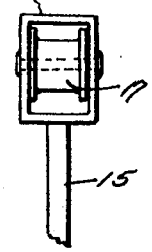
Inventor
William B. Chelini
By Clarence A. O'Brien
Attorney Patented Nov. 10, 1931

1,831,286

UNITED STATES PATENT OFFICE

WILLIAM B. CHELINI, OF ROSS, CALIFORNIA

DECOY DUCK

Application filed July 18, 1929. Serial No. 379,243.

This invention relates to decoy ducks and an object of the invention is to provide a decoy that will be disposed into the wind at all times and furthermore to provide for raising the duck and causing the outstretching of the wings, so as to simulate a live duck when it is about to raise itself from the water preparatory to flying.

A further feature of the invention is to provide a decoy duck that rises and falls in a vertical plane like a natural fowl and not forward and backward as other stationary decoy ducks perform.

Another object of the invention is to provide a decoy that is operable from a remote control point so as not to scare the ducks being decoyed.

Further objects of the invention are to provide, in a manner as hereinafter set forth, a decoy duck of the character referred to, which is strong, compact and durable, thoroughly reliable for its intended purpose, very simple in its method of assembly, thoroughly reliable in its operation, and comparatively inexpensive to manufacture and install.

With the foregoing and other objects in view, the invention consists in the novel construction, combination and arrangement of parts as will be hereinafter more specifically described and illustrated in the accompanying drawings, wherein is disclosed an embodiment of the invention, but it is to be understood that changes, variations and modifications may be resorted to, without departing from the spirit of the claims hereunto appended.

In the drawings, wherein like reference characters denote corresponding parts throughout the several views:

Figure 1 is a side elevation of the device in accordance with the present invention, illustrating an application thereof to the body of water being utilized as a hunting ground.

Figure 2 is a side elevation thereof illustrating the decoy in the operative position simulating a duck about to take flight.

Figure 3 is a front elevation of the decoy partly in section.

Figure 4 is a horizontal detailed section taken substantially on the line 4—4 of Figure 2.

Figure 5 is a fragmentary end view of the frame at the forward end thereof, and

Figure 6 is a fragmentary vertical section through the body of the duck illustrating the operation of the wings.

While the description and drawings of the present invention illustrate an application thereof with a body simulating a duck, it is to be understood that the present invention is applicable to any type of water fowl.

Referring to the drawings in detail, 7 indicates the surface of the water and 8 indicates the bed of the body of water in which is driven a wooden stake 9. A substantially U-shaped frame indicated generally at 10 is disposed in a vertical plane submerged below the surface of the water 7. Intermediate the ends of the bight portion 11 of the frame 10 there is secured a depending arm 12 which is slidably and rotatably mounted in a sleeve or piece of pipe 13, which is clamped to the stake 9 as at 14. The forward leg 15 of the substantially U-shaped frame 10 inclines slightly forwardly and has secured to the free upper end thereof a rectangular sheave wheel 17. There are spaces between the upper and lower portions of the cage and the sheave wheel 17 to provide spaces for training the looped operating cable 18 therethrough. The operating cord 18 extends to a remote control point such as a boat, a blind or any point from which the ducks are to be shot. On the upper end the rear leg 19 of the substantially U-shaped frame 10 there is secured a pair of laterally extending oppositely disposed arms 20, 21, for a purpose presently to be described.

A solid body made to simulate a duck is indicated at 22, and may be formed of wood, cork or any aqueous buoyant material. The body 22 is supported upon the substantially U-shaped pair of bars 23, disposed in transverse spaced relation to each other. Portions of the bars 23 are embedded upon the opposite sides of the body of the duck as indicated by the dotted lines in Figures 1 and 2 of the drawings and the forward ends of each bar 23 are supported rigidly across a substantially rectangular recess 24, formed in the shoulder portions of the ducks as indicated at 25 in Figure 6 of the drawings. A portion of the bars 23 depend from the lower side of the duck 22 and are rockably engaged by the ends of the oppositely disposed extensions 20, 21. The extensions 20, 21 are adapted to engage the bars 23, in the angle formed between the bight portion and the lower leg of the substantially U-shaped bars 23, as will be clearly understood by referring to Figures 1 and 2 of the drawings. The forward free end of each bar 23 is provided with a loop 26, in which is journaled the opposite ends of the crank arm 27. Intermediate the ends of the crank arm and an alignment with the forward leg 15, there is the rigidly connected drum 28. The inner end of the control cable 18 is trained about the periphery of the drum 28 and is rigidly secured thereto by means of hold-fast devices 29. The crank arm 27 on the opposite sides of the drum 28 is formed with a crank 30.

A pair of wings indicated generally at 30′ are mounted upon the opposite side of the body 22 and made to simulate the wings of a duck, that is to say, the wings are foldable upon the back of the duck and may be rocked in a manner to be presently described, in outstretched position so as to imitate the waving motion of the wings when in flight. To accomplish the simulation of the natural duck, the wings are formed in two sections 32, 33, and that the inner end of the inner section 33 is formed with an integral longitudinally extending sleeve 34 coextensive with the marginal edges thereof. The sleeve 34 is circumposed about the end 25 of the inner end of the substantially U-shaped rods 23, to form a hinge connection for the wing which permits rocking movement thereof to imitate the flapping of the wings of the duck when in flight.

The sleeve 34 is disposed in the recess 24 so that the outer contour of the wing conforms to the shape of the body of the duck. A pair of connecting rods 35 are pivoted at their upper ends to the inner section 33 of the wing and extend through openings 36 projecting downwardly through the body of the duck 22 and the lower ends thereof are journaled to the cranks 30 as indicated at 37. The outer section 32 of the wing 30′ is rigidly secured to the outer end 38 of an arm, the inner end of which is pivoted to the inner section 33 as at 39, whereby the outer section 32 may be folded to conform to the contour of the back of the duck when the duck is resting or may be extended to open position when the duck is supposed to be in flight. Secured to the inner end of the wing arm, as at 40, is a cable 41, which extends through an opening 42, in the body of the duck and the lower end of the cable 41 is rigidly attached to the bight portion 11 of the frame 10 as at 43, which is adjacent the forward leg 15. On the end of the arm 38 there is attached, as at 44, another cable 45, which is trained by means of suitable pulleys 46 through an opening 47 in the tail of the duck. Adjacent the lower end of the cable 45 there is provided a weight 48, to take up slack in the cable and the lower end of the cable is secured in a pair of clips 49, projecting rearwardly from the bight portion 11 of the frame 10. In the application of the present invention, the duck, when in the inoperative position rests or is floated upon the surface of the water 7 as is indicated in Figure 1 of the drawings. When the duck is in the operative position, where the wings are being flapped and also when the body 22 is raised above the surface of the water, the latter position is shown in Figure 2 of the drawings. In the inoperative position of Figure 1 of the drawings, the control cord or cable 18 is in slack position and the duck is buoyed on the surface of the water by reason of the material therein. In the latter position the supporting arms 23 are disposed at the angle shown in Figure 1 of the drawings. To raise the body of the duck to simulate the same about to take flight, the control cord 18 is pulled taut, whereby the body 22 is rocked, upon the extension 20, 21, to the position shown in Figure 2 of the drawings. When the body is rocked to this position, the cord 41 pulls the outer wing sections 32 to extended position. In this latter position, the control cords 18 may be worked backwardly and forwardly whereby the connecting rods 35 will cause the wings to flap in this extended position to simulate a duck in a position about to take flight. The rocking movement causes the body 22 to rise above the surface of the water in the angular position illustrated in Figure 2 of the drawings. When it is desired to have the duck assume a normal position the control cable 18 is relieved of tension whereby the weight 48 pulls the outer section 32 of the wing into the folded position shown in the drawings and with the settling of the duck 22 upon the water, the inner section 33 will be folded upon the side of the duck, either by manipulation of the cord 18 or the weight of the wing.

It is to be understood that by describing in detail herein any particular form, structure or arrangement, it is not intended to limit the invention beyond the terms of the several claims nor the requirements of the prior art.

Live ducks cannot see the lower mechanism of the present invention through the clear water which would scare them, but actual demonstration shows that when pulling the cables the action of the frame slidable in the stake ripples the water to such an extent that none of the mechanism below the surface can be seen. This is natural because after a duck rises to the surface from feeding on the bottom of the pond the water is rippled and the action of the decoy carries out that effect.

What is claimed is:

1. A decoy duck comprising a frame movably supported on the bed of the body of water being utilized, a solid buoyant body simulating a water fowl movably connected with said frame, foldable wings hingedly connected to said body, means controllable at a remote point for raising the body into flying position and furthermore to cause the outstretching of the wings, and independent means connected to the frame and to the wings to fold and unfold said wings simultaneously with the raising of the body, said frame being substantially U-shaped, said body raising means having the means for outstretching the wings movably coupled thereto, said body raising means extending through the body longitudinally thereof and forming a hinged connection for the outstretching movement.

2. A device of the class described comprising a supporting frame to be submerged in a body of water, a second frame supported for rocking movement on the first frame, a decoy duck connected with the second frame, and means for rocking the second frame from a distant point.

3. A device of the class described comprising a supporting frame to be submerged in a body of water, a second frame supported for rocking movement on the first frame, said second frame having a part extending above the surface of the water, a decoy duck attached to said part whereby the duck will rest on the surface and means for rocking the second frame from a distant point.

4. A device of the class described comprising a supporting frame to be submerged in a body of water, a second frame supported for rocking movement on the first frame, said second frame having a part extended above the surface of the water, a decoy duck attached to said part whereby the duck will rest on the surface, means for rocking the second frame from a distant point, foldable wings hinged to the body, and means connected with the means for rocking the duck for moving the wings.

In testimony whereof I affix my signature.
ture.

WILLIAM B. CHELINI.